3,402,979
LIGHT POLARIZER
Yoh-Han Pao, Chatham, and Peter M. Rentzepis, Bernardsville, N.J., assignors to Bell Telephone Laboratories, Incorporated, New York, N.Y., a corporation of New York
No Drawing. Filed Mar. 30, 1965, Ser. No. 444,028
1 Claim. (Cl. 350—147)

ABSTRACT OF THE DISCLOSURE

The specification describes a polarizer structure employing a transparent single crystal in which periodic bands of a diffusant such as gold or silver are produced as the result of the Liesegang effect. Structures having a uniform grid of several thousand lines per inch can be produced.

---

This invention relates to light polarizers and to methods for their manufacture.

With the increased interest in the technology of light radiation in the nonvisible regions the scarcity of effective polarizers in these regions has become apparent. There are essentially no satisfactory polarizers in the vacuum ultraviolet and few in the infrared, some of the latter are quite difficult and expensive to construct.

It is known that very few materials are sufficiently transparent at far infrared or vacuum ultraviolet frequencies to serve as spectrometer windows, and the same difficulties which limit the choice of window materials have also hindered the development of suitable polarizers for use in these regions. However, even with the limited materials which are suitably transparent, the difficulty of obtaining a polarizing structure remains.

Light polarizers commonly used are of the dichroic variety or, for more demanding optical application, prism polarizers based upon double refraction are available. Usually ignored are wire grid polarizers, probably due to the difficulty in constructing a grid structure.

The practical manufacture of a wire grid structure involves the preparation of a grid of several hundred to several thousand microscopic wires per inch on a supporting substrate preferably in a single operation. It has also been proposed to form a multilayer heterogeneous evaporated structure. However, the construction of a polarizer having a useful aperture by this technique would require several hundred to several thousand separate evaporating steps and is therefore quite unattractive. Another solution is presented in the Journal of the Optical Society of America, Vol. 50, pp. 886–891, 1960. This method has obvious limitations, for instance, the preparation of rulings fine enough for operation in the ultraviolet, would be difficult to obtain using the scheme proposed.

The basis for the present invention is a completely different approach to the preparation of wire grid polarizers. Very fine structures with excellent uniformity and precision are obtained by utilizing the characteristic behavior of the diffusion of certain ions into crystal structures in which periodic precipitation of the diffusant produces a band-like structure. This phenomenon is known as the Liesegang effect.

The host crystals of interest for polarizers in the infrared and ultraviolet are crystals of the halogen salts of the alkali and alkaline earth metals. Of particular interest among these are CaF, NaCl, CsBr, CsI, for use in the infrared and LiF and MgF for use in the ultraviolet. Other crystal material such as quartz and sapphire are useful also. The host material must be a single crystal as crystal boundaries will interrupt the periodicity and alignment of the precipitation bands.

The diffusing ion which forms the bands is preferably gold or silver.

The following example is given to demonstrate a technique for making the polarizer of the invention.

A single crystal cube of MgF is polished so as to provide one optically flat face. The crystal is heated to 600° C. in a vacuum of $10^{-5}$ mm. Hg for a period of five hours to remove oxygen from the crystal. Silver is applied to the flat surface by evaporation or other suitable method. The amount of silver may be of the order of 0.5 gram/$cm.^2$. The cube is then again heated in vacuum (or inert atmosphere) for twenty hours. The diffusion into the crystal is limited to the coated surface by providing a refractory metal baffle such as tantalum or tungsten to prevent exposure of the free surfaces to silver vapor.

At the termination of the diffusion the crystal is cooled slowly and by microscopic examination is found to have periodically precipitated silver bands spaced at regular intervals (several hundred lines/mm.) to a depth of two centimeters from the silver coated surface. With this technique, grid-like structures having from several hundred to several thousand lines per cm. can be made. Such structures are capable of polarizing light radiation of infrared frequencies and higher.

Other host crystals such as CaF, NaCl, CsI, CsBr, LiF, quartz and sapphire can be treated in the same manner to obtain periodic structures. Differences occur in the number of precipitation bands per cm. However, for the purposes of this invention it is preferred that the number be of the order of at least 2,000 lines per inch. It is apparent to those skilled in the art that the linear extent of the grid-like structure will vary somewhat with the particular host crystal used and according to whether silver or gold is the diffusant. This affects the total diffusion time to produce a structure of a desired length according to diffusion coefficients which are well known in the art and within ordinary skill to determine.

What is claimed is:
1. A light polarizer comprising a single crystal having essentially planar major faces and having a composition selected from the group consisting of CaF, NaCl, CsBr, CsI, LiF, MgF, $SiO_2$ and $Al_2O_3$, the crystal containing periodically occurring precipitation bands of a metal selected from the group consisting of silver and gold, the bands being parallel to one of the planar faces of the crystal and having a periodicity of at least 2000 lines per inch, the said precipitation bands being the result of a diffusion process of ions of said metal into said composition according to the Liesegang effect.

References Cited

UNITED STATES PATENTS 3,226,225 12/1965 Weiss et al.
3,291,550 12/1966 Bird et al. _____ 350—147
3,293,331 12/1966 Doherty _____ 350—147 X DAVID SCHONBERG, *Primary Examiner.*

P. R. MILLER, *Assistant Examiner.*